(12) United States Patent
Losey et al.

(10) Patent No.: US 10,032,477 B2
(45) Date of Patent: Jul. 24, 2018

(54) SYSTEMS AND METHODS FOR MODIFYING A PLAYLIST OF MEDIA ASSETS BASED ON USER INTERACTIONS WITH A PLAYLIST MENU

(71) Applicant: United Video Properties, Inc., Santa Clara, CA (US)

(72) Inventors: Michael Shane Losey, Saline, MI (US); Maeve Kathleen Sullivan, Ypsilanti, MI (US)

(73) Assignee: Rovi Guides, Inc., San Jose, CA (US)

( * ) Notice: Subject to any disclaimer, the term of this patent is extended or adjusted under 35 U.S.C. 154(b) by 96 days.

(21) Appl. No.: 14/192,799

(22) Filed: Feb. 27, 2014

(65) Prior Publication Data
US 2015/0242068 A1     Aug. 27, 2015

(51) Int. Cl.
  *G06F 17/30*    (2006.01)
  *G11B 27/00*    (2006.01)
  *G06Q 30/02*    (2012.01)

(52) U.S. Cl.
  CPC ............ *G11B 27/00* (2013.01); *G06Q 30/02* (2013.01)

(58) Field of Classification Search
  CPC .......... G06F 17/30256; G06F 3/04842; G06F 17/30; G06F 3/0482; G06F 17/30873; G06F 3/048; G06F 3/0486; G06F 3/04847; G06F 3/165; G06F 17/30775; G06Q 10/06; G06Q 30/00; G06Q 30/02; G06Q 30/0264; G11B 27/00
  USPC ................. 707/722, 769, E17.014, E17.009, 707/E17.108; 715/716, 776, 702, 745, 715/854, 850, 852; 705/14.49, 14.55, 705/14.7
  See application file for complete search history.

(56) References Cited

U.S. PATENT DOCUMENTS

| | | | |
|---|---|---|---|
| 5,616,876 A * | 4/1997 | Cluts ................. | G06F 17/30749 707/E17.101 |
| 6,239,794 B1 | 5/2001 | Yuen et al. | |
| 6,388,714 B1 | 5/2002 | Schein et al. | |

(Continued)

FOREIGN PATENT DOCUMENTS

| | | |
|---|---|---|
| CN | 103247312 | 8/2013 |
| WO | WO-02/102079 | 12/2002 |

OTHER PUBLICATIONS

International Search Report and Written Opinion for International Applicaiton No. PCT/US2015/017202 dated May 22, 2015 (10 pages).

(Continued)

*Primary Examiner* — Anh Ly
(74) *Attorney, Agent, or Firm* — Haley Guiliano LLP

(57) ABSTRACT

Methods and systems are provided herein for modifying playlists of media assets. In some aspects, these methods and systems are provided by way of receiving a user input that causes a media asset in a playlist to cease from being played back and to be removed from the playlist. User interactions associated with the playlist may subsequently be monitored, where, in response to detecting a user interaction while monitoring, a number of user interactions that have been received subsequent to the user input may be determined. The number of user interactions may be compared to a threshold number, and, when the number of user interactions corresponds to the threshold number, the media asset may be inserted into the playlist.

14 Claims, 8 Drawing Sheets

(56) References Cited

U.S. PATENT DOCUMENTS

| | | | |
|---|---|---|---|
| 6,564,378 B1 | 5/2003 | Satterfield et al. | |
| 6,756,997 B1 | 6/2004 | Ward, III et al. | |
| 7,165,098 B1 | 1/2007 | Boyer et al. | |
| 7,689,510 B2* | 3/2010 | Lamkin | G06F 17/30041 705/51 |
| 7,761,892 B2 | 7/2010 | Ellis et al. | |
| 7,884,274 B1 | 2/2011 | Wieder | |
| 8,046,801 B2 | 10/2011 | Ellis et al. | |
| 8,332,895 B2 | 12/2012 | Nathan et al. | |
| 8,359,290 B1* | 1/2013 | Muthusrinivasan | H04L 67/146 707/632 |
| 8,584,175 B2 | 11/2013 | Nathan et al. | |
| 8,656,043 B1 | 2/2014 | Wieder | |
| 8,713,172 B1* | 4/2014 | Linsley | G06F 17/30905 709/217 |
| 9,448,619 B1 | 9/2016 | Kerns et al. | |
| 2002/0174430 A1 | 11/2002 | Ellis et al. | |
| 2003/0110499 A1 | 6/2003 | Knudson et al. | |
| 2003/0149980 A1* | 8/2003 | Hassell | H04N 21/6143 725/39 |
| 2004/0117831 A1* | 6/2004 | Ellis | H04N 5/44543 725/53 |
| 2005/0251827 A1 | 11/2005 | Ellis et al. | |
| 2006/0161635 A1* | 7/2006 | Lamkin | G06F 17/30041 709/217 |
| 2006/0267995 A1* | 11/2006 | Radloff | G11B 27/105 345/530 |
| 2007/0025701 A1 | 2/2007 | Kawasaki et al. | |
| 2007/0136753 A1* | 6/2007 | Bovenschulte | H04H 60/31 725/46 |
| 2008/0115173 A1* | 5/2008 | Ellis | H04N 5/44513 725/61 |
| 2008/0313016 A1 | 12/2008 | Panje | |
| 2009/0007195 A1 | 1/2009 | Beyabani | |
| 2009/0113301 A1* | 4/2009 | Fisher | G06F 8/61 715/716 |
| 2010/0153885 A1 | 6/2010 | Yates | |
| 2010/0191856 A1* | 7/2010 | Gupta | H04L 61/1511 709/228 |
| 2010/0333137 A1* | 12/2010 | Hamano | H04H 60/46 725/39 |
| 2011/0004330 A1* | 1/2011 | Rothkopf | G11B 27/105 700/94 |
| 2011/0279311 A1* | 11/2011 | Hamano | G06F 17/30241 342/357.25 |
| 2011/0282189 A1* | 11/2011 | Graumann | A61B 6/12 600/427 |
| 2011/0283322 A1* | 11/2011 | Hamano | H04N 5/44543 725/44 |
| 2012/0069131 A1* | 3/2012 | Abelow | G06Q 10/067 348/14.01 |
| 2012/0221975 A1* | 8/2012 | Juristovski | G06F 17/30026 715/823 |
| 2012/0309515 A1* | 12/2012 | Chung | H04N 21/274 463/31 |
| 2013/0079924 A1* | 3/2013 | Garda | G06F 19/3462 700/236 |
| 2013/0103814 A1* | 4/2013 | Carrasco | H04L 65/4092 709/223 |
| 2013/0268889 A1* | 10/2013 | Barak | G06F 3/048 715/825 |
| 2013/0282365 A1* | 10/2013 | Van De Ven | G06F 17/27 704/9 |
| 2014/0075314 A1* | 3/2014 | Bachman | G06F 3/0486 715/716 |
| 2014/0098394 A1* | 4/2014 | Tanisaki | H04N 1/00323 358/1.13 |
| 2014/0156381 A1* | 6/2014 | Monsees | G06Q 30/02 705/14.43 |
| 2014/0214813 A1* | 7/2014 | Braham | G06F 17/30648 707/723 |
| 2014/0244834 A1* | 8/2014 | Guedalia | H04L 67/16 709/224 |
| 2014/0282061 A1* | 9/2014 | Wheatley | H04N 21/431 715/745 |
| 2014/0282661 A1* | 9/2014 | Martin | H04N 21/23418 725/18 |
| 2014/0344034 A1* | 11/2014 | Goodman | G06Q 30/0209 705/14.12 |
| 2015/0007212 A1* | 1/2015 | Woods | H04N 21/4312 725/18 |
| 2015/0012344 A1* | 1/2015 | Guinn | G06Q 30/0209 705/14.12 |
| 2015/0012946 A1* | 1/2015 | Woods | H04N 21/84 725/41 |
| 2015/0052549 A1 | 2/2015 | Teixeira et al. | |
| 2015/0081609 A1* | 3/2015 | Hande | G06Q 50/01 706/46 |
| 2015/0099507 A1* | 4/2015 | Cassidy | H04L 63/102 455/419 |
| 2015/0169631 A1* | 6/2015 | Gu | G06F 17/30244 707/723 |
| 2015/0169754 A1* | 6/2015 | Gu | G06F 17/30256 707/728 |
| 2015/0295808 A1* | 10/2015 | O'Malley | H04L 47/22 709/224 |
| 2016/0252964 A1* | 9/2016 | Klappert | G06F 3/017 348/51 |

OTHER PUBLICATIONS

U.S. Appl. No. 14/192,607, filed Feb. 27, 2014, Michael Shane Losey.

* cited by examiner

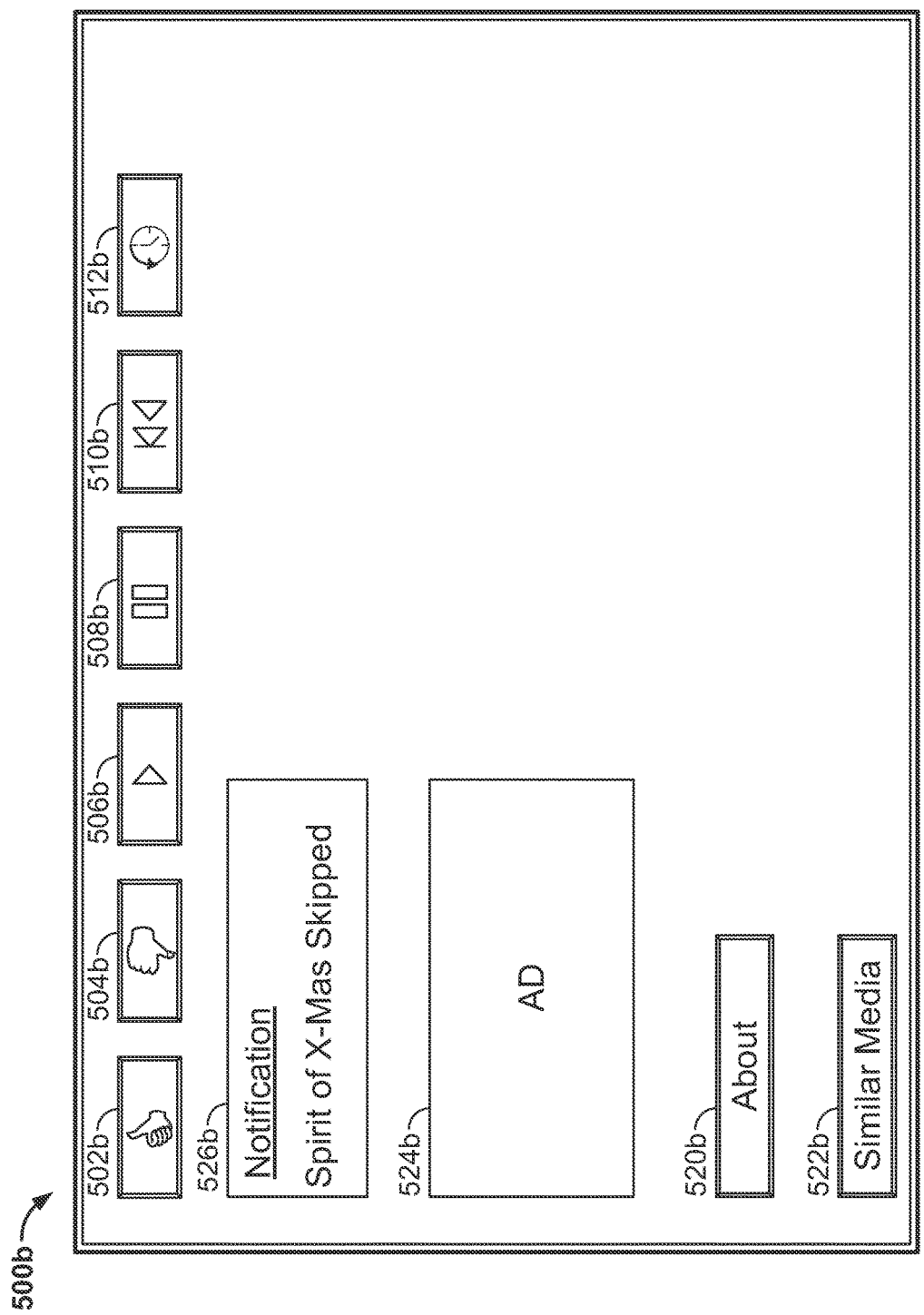

SYSTEMS AND METHODS FOR MODIFYING A PLAYLIST OF MEDIA ASSETS BASED ON USER INTERACTIONS WITH A PLAYLIST MENU

BACKGROUND

Playlist-based media consumption is becoming more popular with each passing day. For example, Internet radio stations are becoming widely used. Playlist-based media consumption providers face a problem of monetizing their products through advertising in a manner that considers and appropriately weighs various user interactions to determine when advertisements should be utilized. Playlist-based media consumption providers also face a problem of providing content that a user desires to consume, and deciding whether and when media content that a user does not presently desire to consume should be again presented to the user.

SUMMARY

Methods and systems are provided herein for determining a dynamic advertisement schedule. For example, in an effort to better monetize playlist services, a playlist-based media consumption provider may monitor user activity and base the timing or content of an advertisement on the user activity. As one example, a playlist provider may determine when to play advertisements as a function of how often a user skips or delays a media asset of a playlist. Furthermore, different user activities (e.g., skips or delays) may cause different effects to the advertisement schedule. The effects of the different user activities on the advertisement schedule may be reflective of the costs incurred by the advertiser and/or content provider when generating playlists, the loss of attention and/or interest of the user if advertisements are played too often, etc.

In some aspects, control circuitry associates a first value with a selectable delay option on a playlist menu (e.g., a "thumbs down" button), and associates a second value with a selectable skip option on the playlist menu (e.g., a "skip" or "fast forward" button). Each time the control circuitry receives a selection of selectable delay option, the control circuitry may add the first value to a composite value, and each time the control circuitry receives a selection of the selectable skip option, the control circuitry may add the second value to the composite value. The first value and the second value may differ from one another, such that a selectable delay option has a higher weight than the selectable skip option, or vice versa. When a user selection of either the selectable delay option or the selectable skip option is received by the control circuitry, the control circuitry may retrieve the composite value. The user selection may be detected by the control circuitry when the control circuitry receives user input of a selection of either the selectable skip or delay option via a mouse or pointer device, one's finger, a stylus, or any other method of user input. The retrieved composite value may be compared to a threshold value by the control circuitry, and when the control circuitry determines that the composite value corresponds to the threshold value, an advertisement may be generated for display on a display screen by the control circuitry and the composite value may be reset by the control circuitry.

In some embodiments, in response to control circuitry receiving a user selection of the selectable delay option, a media asset is removed from a playlist for a period of time by the control circuitry. For example, if a user presses a "thumbs down" button while a song is playing on an Internet radio station, the song may be removed from a playlist that the Internet radio station is based on for, e.g., a month. In some embodiments, the period of time may be specified by a user. For example, the user may select how long a song is to be delayed on a menu. As another example, the user may input a custom amount of time the user desires a song be delayed.

In some embodiments, when control circuitry detects a user selection of a skip option, a media asset may be caused to cease playing back by the control circuitry, and the next media asset of a playlist may be played back. The skipped media asset may not be played back again until the playlist cycles back to the skipped media asset. For example, if a skip button is pressed while a song is playing, the system may skip to the next song, and the song that was skipped may be reserved to be played again several hours later when the rest of the playlist has been played back and the skipped song is reached again.

In some embodiments, when control circuitry determines that the selectable skip option is selected, a notification may be generated for display that a media asset has been skipped. For example, if the song "Winter Wonderland" by Ray Charles is playing when the selectable skip option is selected, a notice may be displayed indicating that "Winter Wonderland" has been skipped.

In some embodiments, when the control circuitry determines that the selectable delay option is selected, a notification may be generated for display that a media asset has been delayed. For example, if the song "Winter Wonderland" by Ray Charles is playing when the selectable skip option is selected, control circuitry may cause a notice to be displayed indicating that "Winter Wonderland" has been delayed. An indication of how long "Winter Wonderland" has been delayed may also be displayed in the notice.

In some embodiments, control circuitry may determine that a subscription payment has been received from the user, and may adjust the threshold value to be a higher value in response to receipt of the subscription payment. For example, a user may pay money to an Internet radio provider, and, in exchange, the Internet radio provider may reduce the amount of advertisements displayed to the user. In some embodiments, advertisements may be removed completely when a subscription payment is received.

In some embodiments, content of the advertisements may be contextually related to content consumed during the current playlist session. For example, if "Winter Wonderland" by Ray Charles is playing, winter-related advertisements may be displayed, such as advertisements for Christmas ornaments or ski clothes.

Methods and systems are also provided herein for modifying playlists of media assets. For example, when a song is skipped or delayed, an Internet radio provider may deem it desirable to eventually play the song again at a particular time in order to maintain user interest in the current Internet radio station. Furthermore, content providers may have a limited number of media assets available thus necessitating the repetition of some songs, even if a user indicates a desire to delay or skip a particular media asset. However, because a user has indicated that he or she does not wish to hear the song at this moment, the media guidance application needs to determine how long the media asset should be skipped or delayed to maintain the interest of the user in the media content.

In some aspects, control circuitry may receive a user input that causes a media asset in a playlist to cease from being played back and to be removed from the playlist. For example, a "Delay" button may be pressed while a song is playing back that causes the song to stop playing, and the next song on a playlist or an advertisement to begin playing. User interactions associated with the playlist may subsequently be monitored by control circuitry, where, in response to detecting a user interaction while monitoring, a number of user interactions that have been received subsequent to the user input may be determined by control circuitry. The user interactions may include, for example, pressing a "Like" or "Thumbs Up" button, requesting more information about a song, exiting and re-entering a playlist, and the like. The number of user interactions may be compared to a threshold number by control circuitry, and, when control circuitry determines that the number of user interactions corresponds to the threshold number, the media asset may be caused to be inserted into the playlist by the control circuitry. For example, when a certain amount of user activity has occurred since a song was delayed, the control circuitry may determine that it would be appropriate to again schedule the song for playback.

In some embodiments, the user input may be a selection of a selectable skip option. For example, a "Skip" or Fast Forward button may be pressed to cause a media asset such as a song to be skipped.

In some embodiments, the user input may be a selection of a selectable delay option. For example, a "Dislike" or "Delay" button may be pressed to cause a media asset such as a song to be skipped.

In some embodiments, the predetermined playlist interactions include one or more of skipping a currently played media asset, delaying a currently played media asset, closing an application that is playing the currently played media asset, shuffling the playlist, pausing the currently played media asset, and fast forwarding the currently played media asset. For example, a detected playlist interaction may involve closing an Internet browser that was playing a song via an Internet radio provider.

In some embodiments, the threshold number may be determined by control circuitry based on a number of songs in the playlist. For example, if a playlist is short, the threshold number may be lower to ensure that the playlist does not run out of songs for playing.

In some embodiments, the number of user interactions may be reset by control circuitry when the playlist is exited by a user. For example, when a user restarts a playlist session by exiting out of an Internet radio provider's website, the threshold may be reset such that the playlist is unaffected by the detected user interactions.

In some embodiments, when it is determined by control circuitry that the playlist is exited by a user, control circuitry may cause the determined number of user interactions to be stored at storage circuitry. It may then be determined by the control circuitry that the playlist is again accessed by the user, and the determined number of user interactions may be retrieved from storage by the control circuitry. For example, when a user stops listening to Internet radio, and then resumes listening the next day, the user interactions detected in the previous interaction may affect the playlist of the Internet radio session when listening is resumed. In further embodiments, the user may stop listening at a first user equipment device, and may resume listening at a second user equipment device, and the user interactions detected in the previous interaction at the first device may affect the playlist of the Internet radio session of the second device.

In some embodiments, when the media asset is caused to be inserted into the playlist by the control circuitry, it may be inserted into the back of the playlist. In other embodiments, the media asset may be selectively inserted by the control circuitry into a position of the playlist. For example, if a user specifies that a song is to be delayed for one hour, the song may be inserted after an hour of other media has been played back.

It should be noted, the systems and/or methods described above may be combined with, applied to, or used in accordance with, other systems, methods and/or apparatuses discussed both above and below.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 5B shows an illustrative embodiment of a display screen including a playlist menu and an advertisement in accordance with some embodiments of the disclosure;

DETAILED DESCRIPTION OF EMBODIMENTS

Figure 1:
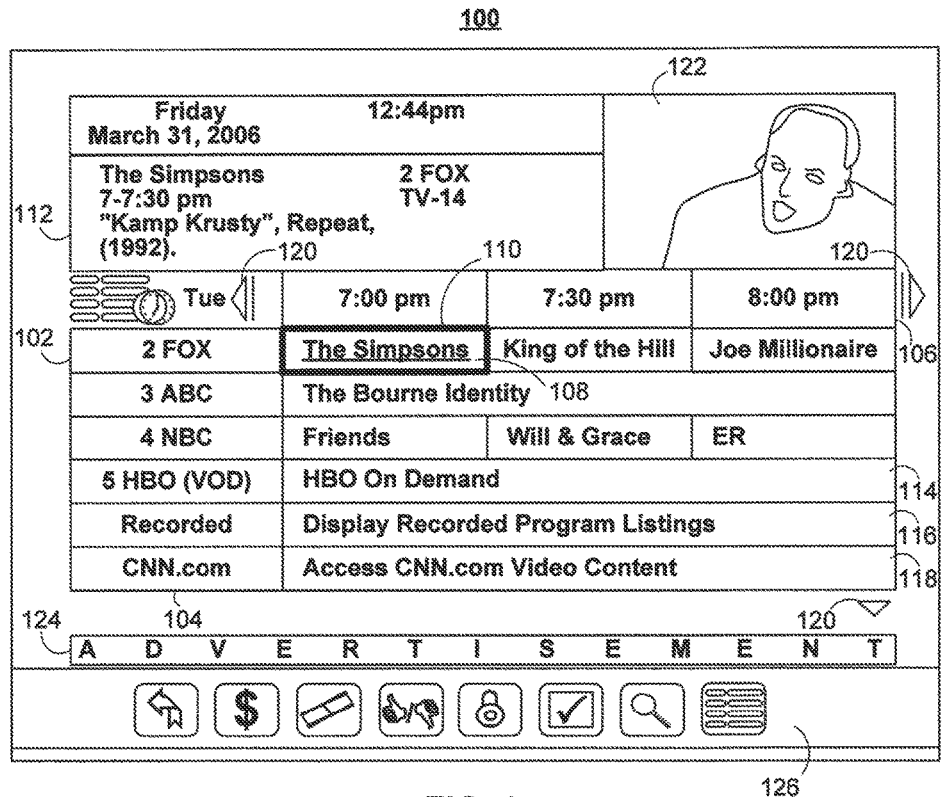
FIG. 1 shows an illustrative embodiment of a display screen that may be used to provide media guidance application listings and other media guidance information in accordance with some embodiments of the disclosure.

Methods and systems are provided herein for determining a dynamic advertisement schedule. For example, in an effort to better monetize playlist services, a playlist-based media consumption provider may monitor user activity and base the timing or content of an advertisement on the user activity. As one example, a playlist provider may determine when to play advertisements as a function of how often a user skips or delays a media asset of a playlist.

In some aspects, control circuitry associates a first value with a selectable delay option on a playlist menu (e.g., a "thumbs down" button), and associates a second value with a selectable skip option on the playlist menu (e.g., a "skip" or "fast forward" button). Each time the control circuitry receives a selection of selectable delay option, the control circuitry may add the first value may be added to a composite value, and each time the control circuitry receives a selection of the selectable skip option, the control circuitry may add the second value to the composite value. The first value and the second value may differ from one another, such that a selectable delay option has a higher weight than the selectable skip option, or vice versa. When a user selection of either the selectable delay option or the selectable skip option is received by the control circuitry, the control circuitry may retrieve the composite value. The user selection may be detected by the control circuitry when the control circuitry receives user input of a selection of either the selectable skip or delay option via a mouse or pointer device, one's finger, a stylus, or any other method of user input. The retrieved composite value may be compared to a threshold value by the control circuitry, and when the control circuitry determines that the composite value corresponds to the threshold value, an advertisement may be generated for display on a display screen by the control circuitry and the composite value may be reset by the control circuitry.

Methods and systems are also provided herein for modifying playlists of media assets. For example, when a song is skipped or delayed, an Internet radio provider may deem it desirable to play the song again at a particular time in order to maintain user interest in a current Internet radio station.

In some aspects, control circuitry may receive a user input that causes a media asset in a playlist to cease from being played back and to be removed from the playlist. For example, a "Skip" button may be pressed while a song is playing back that causes the song to stop playing, and another song or an advertisement to begin playing. User interactions associated with the playlist may subsequently be monitored by control circuitry, where, in response to detecting a user interaction while monitoring, a number of user interactions that have been received subsequent to the user input may be determined by control circuitry. The user interactions may include, for example, pressing a "Like" or "Thumbs Up" button, requesting more information about a song, exiting and re-entering a playlist, and the like. The number of user interactions may be compared to a threshold number by control circuitry, and, when control circuitry determines that the number of user interactions corresponds to the threshold number, the media asset may be caused to be inserted into the playlist by the control circuitry. For example, when a certain amount of user activity has occurred since a song was skipped, the control circuitry may determine that it would be appropriate to again schedule the song for playback.

The term "playlist" wherever used in this disclosure refers to an aggregation of media assets designated for consecutive playback. The media assets of the playlist may be aggregated manually or automatically. Media other than the media assets of the playlist may disrupt the consecutive playback of the media assets of the playlist. For example, an advertisement may be played between two adjacent media assets of the playlist. The contents of a playlist need not be organized or displayed in the form of a list, as the playlist may comprise any form of organization or aggregation of media assets.

The term "playlist menu" wherever used in this disclosure refers to a collection of one or more selectable options that, when selected, affect any of a playlist, media within a playlist, or the playback of media within a playlist A playlist menu may further include a display of one or more media assets included within the playlist. Selectable options may include options such as "skip," "like," "dislike," "delay," "fast forward," "delete," and any other option that affects a playlist, media within a playlist, or the playback of media within a playlist. The term "playlist menu" may be used interchangeably with the word "dashboard;" each term carries identical weight and effect.

The term "delay" wherever used in this disclosure refers to the act of causing a next occurrence of a media asset in a playlist to be delayed in any possible manner. A media asset may be delayed for a period of time, or for the duration of a particular number of media assets. The delay may be determined automatically by control circuitry, or may be manually selected by a user. At the expiration of a delay, a media asset may be inserted back into a playlist. A delay may be accomplished by moving a media asset to a different position than its original position on a playlist, or by removing a media asset from a playlist entirely until a delay condition is satisfied. A delay condition is a condition that, when satisfied, signals that a media asset is to be inserted into a playlist (e.g., a requisite period of time has passed since a song was delayed).

The term "skip" wherever used in this disclosure refers to the act of causing a media asset in a playlist to be skipped over, but the media asset's position in the playlist to not be disturbed. As such, the media asset that was skipped over may be played again when a playlist has been played through and the next media asset on the playlist is again the skipped media asset.

As referred to herein, the phrase "fast-access playback operations" should be understood to mean any operation that pertains to playing back a non-linear media asset at faster than normal playback speed or in a different order than the media asset is designed to be played, such as a fast-forward, rewind, skip, chapter selection, segment selection, skip segment, jump segment, next segment, previous segment, skip advertisement, or commercial, next chapter, previous chapter or any other operation that does not play back the media asset at normal playback speed. The fast-access playback operation may be any playback operation that is not "play," where the play operation plays back the media asset at normal playback speed.

The term "user interaction" wherever used in this disclosure refers to any interaction that a user may have that affects a playlist, a media asset of a playlist, or the playback of a media asset of a playlist. The term "user interaction" may also refer to any interaction that a user has that affects any aspect of a playlist menu, such as an interaction that causes further media to appear or disappear from a playlist menu, or an interaction that causes media to playback or stop playing back (e.g., pausing or resuming an advertisement). A user interaction may specifically include an interaction that causes fast-access playback operations to execute. A user interaction may also specifically include a user interaction that causes a media asset to be assessed a rating, an interaction that causes a media asset to be delayed or skipped, and/or an interaction that indicates a user's interest in a media asset.

The amount of content available to users in any given content delivery system can be substantial. Consequently, many users desire a form of media guidance through an interface that allows users to efficiently navigate a playlist and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as online applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
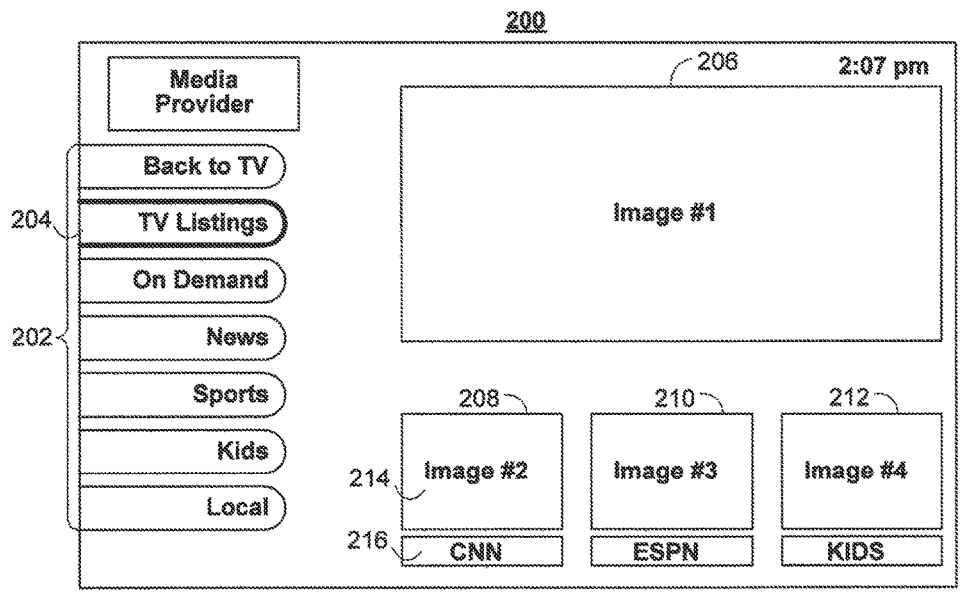
FIG. 2 shows another illustrative embodiment of a display screen that may be used to provide media guidance application listings in accordance with some embodiments of the disclosure.

FIGS. 1-2 show illustrative display screens that may be used to provide media guidance data. The display screens shown in FIGS. 1-2, 5A, and 5B may be implemented on any suitable user equipment device or platform. While the displays of FIGS. 1-2, 5A, and 5B are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information. The display screens of FIGS. 1 and 2 may be utilized to select content for populating a playlist.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet website or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other websites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
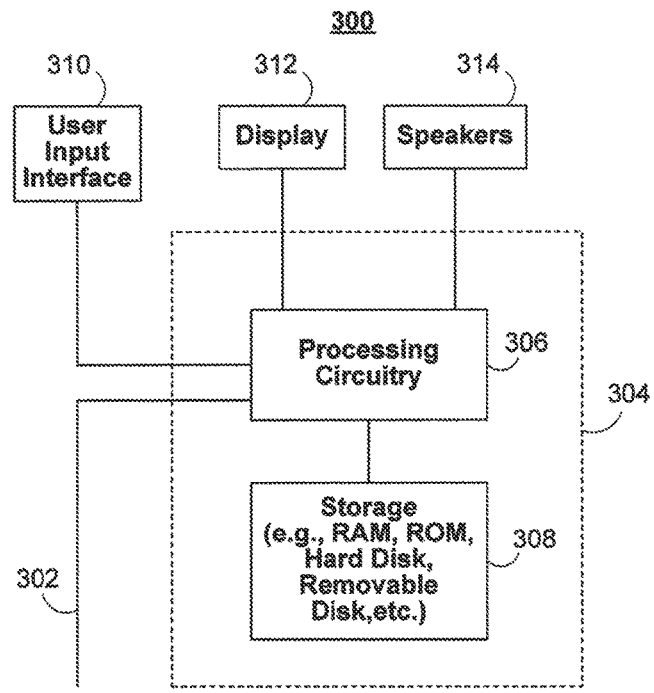
FIG. 3 is a block diagram of an illustrative user equipment (UE) device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data and guidance application data that are described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
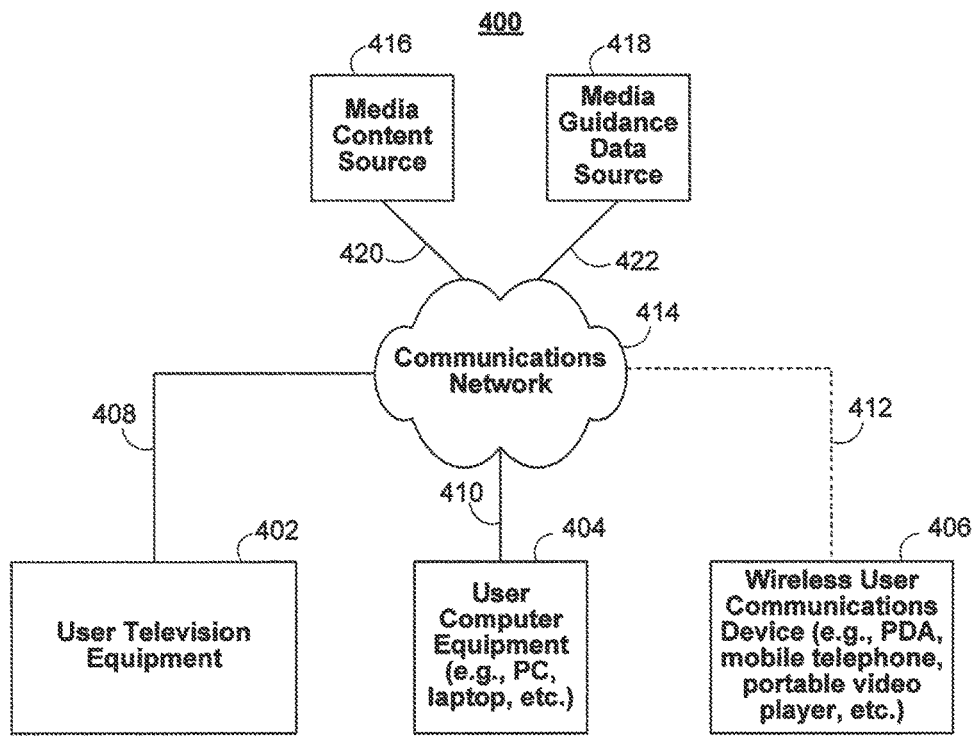
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a website accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the website www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, when a user is consuming media assets, the user may view a playlist menu to manage and interact with a playlist. The menu may enable the user to, e.g., pause, play, or skip a media asset that is currently playing. The user may interact with the menu via any known user input interface (e.g., user input interface 310) and may view the playlist menu on a display of a user equipment device (e.g., display 312).

Figure 5A:
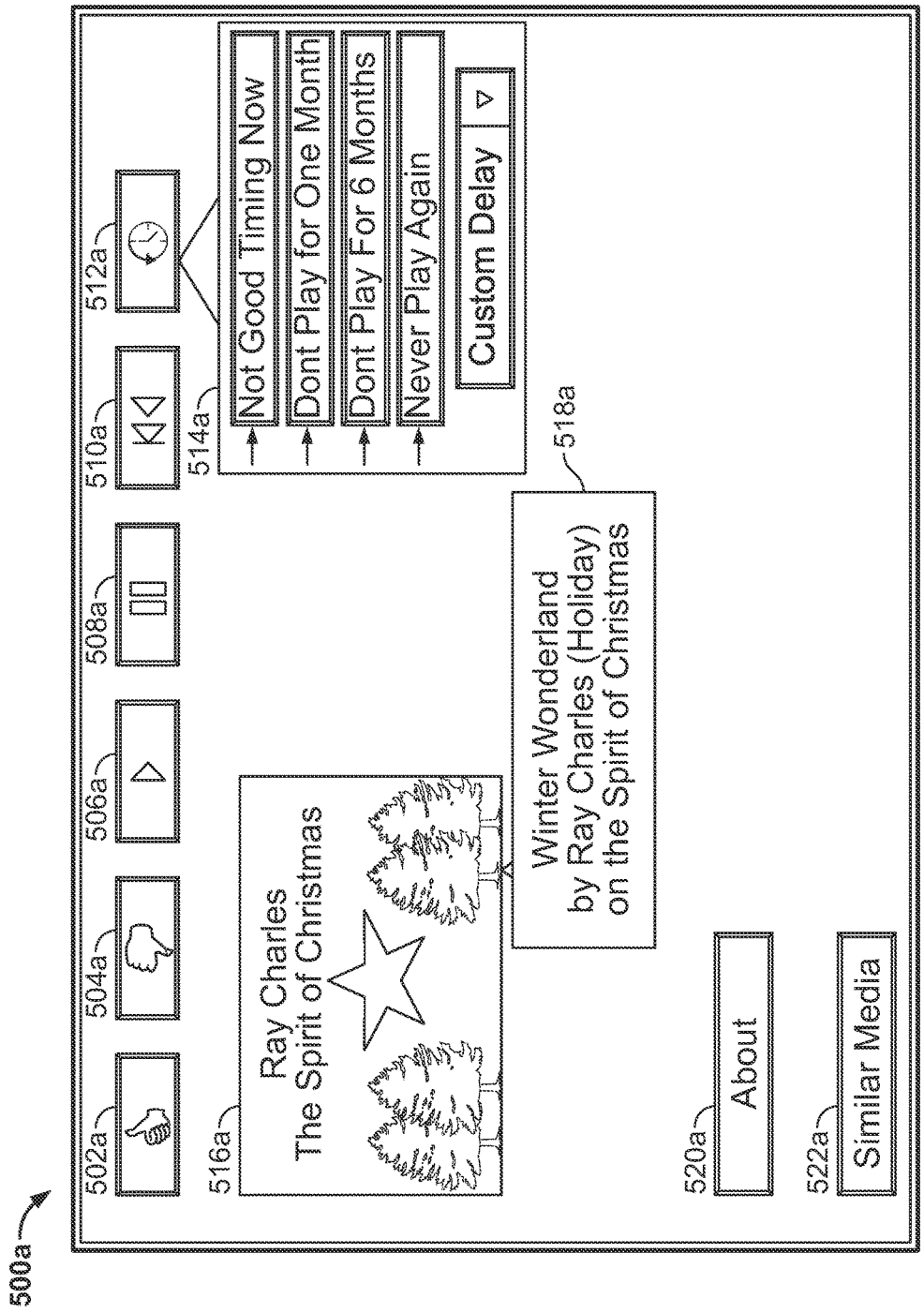
FIG. 5A shows an illustrative embodiment of a display screen including a playlist menu in accordance with some embodiments of the disclosure.

FIG. 5A shows an illustrative embodiment of a display screen including a playlist menu in accordance with some embodiments of the disclosure. Following from FIG. 5A, playlist menu 500a may include various options. Option 502a may be a "Thumbs Up" option or "Like" option. When option 502a is selected (e.g., via user input interface 310), control circuitry 304 may cause a presently playing media asset to appear in greater frequency on a playlist. Alternatively, or additionally, when option 502a is selected, control circuitry 304 may cause a media asset that is related to a presently playing media asset to appear in greater frequency on a playlist. Furthermore, when option 502a is selected, control circuitry 304 may cause an advertisement to be displayed (e.g., on display 312) that has a context related to the context of a presently playing media asset.

Option 504a may be a "Thumbs Down" or a "Dislike" option. When option 504a is selected (e.g., via user input interface 310), control circuitry 304 may cause a presently playing media asset to be removed from a playlist. When option 504a is selected, control circuitry 304 may also cause a presently playing media asset to appear in a lesser frequency on a playlist or to disappear from a playlist altogether. When option 504a is selected, control circuitry 304 may alternatively or additionally cause a media asset that is related to a presently playing media asset to appear in lesser frequency on a playlist or to disappear from the playlist altogether. Additionally or alternatively, when option 504a is selected, control circuitry 304 may cause a media asset to be delayed. The delay functionality will be discussed with further detail with respect to option 512a below. Options 504a and 512a may, in some embodiments, share similar functionality and may be combined into one single option.

Option 506a may be a "Play" or "Begin" option. When option 506a is selected (e.g., via user input interface 310), control circuitry 304 may cause a media asset to begin playing if playback of the media asset has not yet begun, or may cause a media asset to resume playing if playback of the media asset is paused.

Option 508a may be a "Pause" option. When option 508a is selected (e.g., via user input interface 310), control circuitry 304 may cause a presently playing media asset to be paused. Selection of the pause option may cause control circuitry 304 to pause any media that is controllable via the playlist menu, such as an advertisement or a video. Control circuitry 304 may cause a media asset or any other media to resume upon a second selection of pause option 508. Control circuitry 304 may also cause a media asset or any other media to be played back in response to selection of thumbs up option 502a, thumbs down option 504a, play option 506a, skip option 510a, or delay option 512a.

Option 510a may be a "Skip" option. When option 510a is selected (e.g., via user input interface 310), control circuitry 304 may cause a presently playing media asset to be skipped. Control circuitry 304 may cause a media asset to be skipped by ceasing to play back the media asset, and by beginning to play a next media asset on a playlist or by playing an advertisement. Control circuitry 304 may disable the interactivity of skip option 510a when certain conditions are met. For example, if a threshold number of media assets have been skipped during a predetermined period of time, control circuitry 304 may prevent a user from skipping further media assets by disabling the interactivity of skip option 510a. Control circuitry 304 may enable the interactivity of skip option 510a after a further predetermined period of time elapses.

Option 512a may be a "Delay" option. When delay option 512a is selected, control circuitry 304 may cause a presently playing media asset to be skipped. Alternatively, control circuitry 304 may enable the presently playing media asset to continue playing. Control circuitry 304 may automatically cause the currently playing media asset to be prevented from playing back for a predetermined amount of time following selection of the Delay option, or may prevent the currently playing song from playing back until a predetermined number of other media assets have been consumed. Control circuitry 304 may alternatively generate a menu for display (e.g., menu 514a) on, e.g., display 312, that enables manual selection of a time for which the media asset shall be delayed. Manual selection options for delay may include a menu of selectable periods of time. For example, should a user select "DON'T PLAY FOR 6 MONTHS" from menu 514a (e.g., via user input interface 310), control circuitry 304 may prevent the currently playing media asset from populating a playlist for six months. Alternatively, a user may enter a custom delay period by inputting a period of time into the custom delay option of menu 514a (e.g., via user input interface 310). The user may input this time by typing text into a text box, selecting from a drop down menu, or the like. Control circuitry 304 may responsively cause the currently playing media asset from populating a playlist for the specified period of time. Delay option 512a may cause the same functionality as provided Skip option 510a to be executed by control circuitry 304, including the ability to skip media assets, and to be disabled by control circuitry 304.

Media asset representation 516a may represent a presently playing media asset. FIG. 5A depicts media asset representation 516a as it may appear if the song "Winter Wonderland" by Ray Charles is playing. In this case, control circuitry 304 may cause the background of media asset representation 516a to be a related pictorial, such as an album cover (e.g., the album cover of "The Spirit of Christmas." In some embodiments, a presently playing media asset may have a video component (e.g., a video episode or a stand-up comedy segment). Where a media asset has a video component, this component may be played back in media asset representation 516. Playlist menu option 502a, 504a, 506a, 508a, 510a, and 512a may apply to a media asset with a video component in the same manner described in the foregoing.

In some embodiments, descriptive information 518a may be generated for display on the playlist menu by control circuitry 304. Descriptive information 518a may include information relating to a currently playing media asset, such as a title, an author, an album, an episode name, a season of an episode, and any other identifying information of a presently playing media asset. For example, if the presently playing media asset is Winter Wonderland by Ray Charles, descriptive information 518a may indicate the song title and the author, as well as the album title "The Spirit of Christmas." Descriptive information may in some embodiments be displayed whenever a currently playing media asset is playing. In other embodiments, media asset representation 516 may be interactive, where, when media asset 516a is selected, control circuitry 304 may generate descriptive information 518a for display. In further embodiments, a selectable option may be generated for display on playlist 500a where, when the selectable option is selected (e.g., via user input interface 310), descriptive information 518a is generated for display on playlist menu 500a.

In some embodiments, "About" section 520a may be generated for display on display 312 by control circuitry 304, such that playlist menu 500a includes section 520a. In some embodiments, section 520a may appear on playlist menu 500a automatically when a media asset is playing. In some embodiments, descriptive information 518a is interactive, and, when descriptive information 518a is selected (e.g., via user input interface 310), "about" section 520a is responsively generated for display by control circuitry 304. "About" section 520a may comprise further descriptive information that relates to a currently playing media asset, such as information about an artist or an episode or a series.

In some embodiments, "Similar Media" section 522a may be generated for display on display 312 by control circuitry 304, such that playlist menu 500a includes section 522a. In some embodiments, similar media section 522a may include media that shares the same context as a currently playing media asset. For example, if the currently playing media asset is Ray Charles' Winter Wonderland, similar media section 522a may comprise media assets by similar artists, or media assets that are related to Christmas, and the like. Similar media section 522a is not limited to media assets that are deliverable over the Internet, and may include advertisements for products or services that are contextually related to a currently playing media asset. For example, control circuitry 304 may cause similar media section 522a to include advertisements for Christmas ornaments, or for a location where a Santa Clause will meet and greet children. For example, control circuitry 304 may determine a frequency that certain similar media should appear in similar media section 522a based on a score. The score may be based on the amount of times a particular artist or song or show has been played during a period of time. In one example, the score may be based on a composite value, where each time a media asset is displayed, a number is added to a composite value relating to attributes of the media asset, and similar media section 522a may include media relating to an attribute with the highest composite value. For example, if songs by artist Eminem are played more than any other song in a playlist, then similar media section 522a may portray media related to Eminem, such as artists with similar styles, or advertisements for Eminem albums that are purchasable.

In some embodiments, when a user selects delay option 512a (e.g., via user input interface 310), a first value associated with delay option 512a is added to a composite value by control circuitry 304. Similarly, when a user selects skip option 510a, a second value associated with skip option 510a is added to the composite value by control circuitry 304. The first value may be associated with delay option 512a in storage circuitry. Similarly, the second value may be associated with skip option 512a in storage circuitry. The storage circuitry may be local (e.g., storage 308) or remote (e.g., media guidance data source 418) and accessible via a communications network (e.g. communications network 414). The composite value may be stored at the same or different storage circuitry, and may be initialized to zero.

Control circuitry 304 may determine that the composite value corresponds to the threshold value. For example, control circuitry 304 may determine that the composite value equals or exceeds the threshold value. In response to this determination, control circuitry may cause an advertisement to be played back. In some embodiments, the advertisement may be an audio advertisement. In other embodiments, as will be discussed with reference to FIG. 5B, control circuitry 304 may generate an advertisement for display.

In some embodiments, control circuitry (e.g., control circuitry 304) may keep track of how many times a selectable delay option is selected, and may keep track of how many times a selectable skip option is selected. The control circuitry may add a weighted value to a composite value each time the selectable delay option and the selectable skip option is selected. When the control circuitry determines that the composite value has reached a threshold value, the control circuitry may cause an advertisement to be displayed on the playlist menu in lieu of a next-scheduled song on a playlist.

FIG. 5B is a block diagram of an illustrative embodiment of a display screen including a playlist menu and an advertisement in accordance with some embodiments of the disclosure. FIG. 5B contains playlist options 502b, 504b, 506b, 508b, 510b, and 512b. The functionality of each playlist option is consistent with that described in the foregoing with respect to FIG. 5A. Similarly, the functionality of "About" section 520b and "Similar Media" section 522b operate in a manner consistent with that described in the foregoing with respect to FIG. 5A.

In FIG. 5B, while media asset representation 516a is not depicted, and instead has been replaced with advertisement 524b by control circuitry 304, such replacement is optional. In some embodiments, advertisement 524b may be generated for display in tandem with media asset representation 516a. In some embodiments, advertisement 524b will replace media asset representation 516a when control circuitry 304 determines that the composite value exceeds the threshold. In some embodiments, advertisement 524b will be generated for display by control circuitry 304 in a manner that does not replace media asset representation 516a in playlist menu 500b. Advertisement 524b may be a still image, a textual description, or a full-motion video. Advertisement 524b may be interactive. For example, Advertisement 524b may be a game that interacts with user input, such as user input detected by control circuitry 304 via user input interface 312. Advertisement 524b may be controllable by selectable options 502b, 504b, 506b, 508b, 510b, and/or 512b. For example, advertisement 524b may be paused by selection of option 508b in a manner consistent with that described in the foregoing. As another example, advertisement 524b may be delayed via selection of delay option 512b in a manner consistent with that described in the foregoing, such that a currently playing advertisement does not appear for a specified period of time. Selectable options 502b, 504b, 506b, 508b, 510b, and/or 512b may have their interactivity disabled by control circuitry 304. For example, control circuitry may force a user to view or listen to an advertisement (e.g., advertisement 524b) by not permitting the user to pause, skip, or delay the advertisement.

In some embodiments, control circuitry 304 may cause advertisement 524b to be contextually related to media assets within a playlist. In other embodiments, control circuitry 304 may cause advertisement 524b to be contextually related to user profile information, such as media assets the user profile has liked or sought additional information about. For example, if control circuitry 304 detects the selection of "Like" button 502a while Ray Charles' "Winter Wonderland" is playing, control circuitry 304 may select advertisement 524b to be an advertisement for Christmas ornaments, or for a location where a Santa Clause will meet and greet with children.

Notification section 526b may be generated for display by control circuitry 304 in playlist menu 500b. Notification section 526b may serve to notify a user about any change in circumstances. As depicted, notification section 526b informs a user that "The Spirit of Christmas" has been skipped. Notification section 526b may be generated in response to the selection of a selectable option, such as selectable skip option 510b. Notification section 526b may be generated for display by control circuitry 304 to reflect any conceivable activity or status, such as the fact that a user liked a media asset in the past, that a media asset has been played or skipped a certain number of times, that a media asset has been delayed for a period of time, or any other activity or status.

In some embodiments, control circuitry 304 may determine that a subscription payment has been received from a user. Control circuitry 304 may determine that a subscription payment has been received by accessing a user profile stored on a database (e.g., media guidance data source 418) via communications 414 and detecting metadata that reflects a subscription. A subscription may be made via playlist 500a by control circuitry 304 detecting a selection of a selectable "subscribe" option (not depicted). Payment may be received by control circuitry 304 by any known method (e.g., a credit card payment, etc).

In response to determining that a subscription payment has been received, control circuitry 304 may adjust the threshold value to be a higher value than the threshold value's original value. In some embodiments, the threshold value may be adjusted in an amount proportional to the amount of subscription money received. The net effect of this feature is to reduce advertisements sent to the user, or eliminate them entirely, should a user subscribe to a playlist service providing playlist menu 500a.

In some embodiments, a user input may occur that causes control circuitry 304 to stop a media asset in a playlist from playing back, and also causes control circuitry 304 to remove the media asset from the playlist. For example, if a user selects selectable "Skip" option 510a, control circuitry 304 may cause a currently playing media asset to stop playing. A similar outcome may arise from a user selecting selectable "Thumbs Down" option 504a, selectable "Pause" option 508a, or selectable "Delay" option 512a. Subsequent to the receipt of the user input that causes the media asset to cease from playing back and be removed from the playlist, control circuitry 304 may monitor for user interactions associated with the playlist. A user interaction may include any interaction discussed in this disclosure, including an interaction with interactive media asset representation 516a, advertisement 524b, or any other user interaction. A user interaction may also include the act of closing an application that is playing the currently played media asset, shuffling a playlist, or fast-forwarding the currently played media asset.

Control circuitry (e.g., control circuitry 304) may compute a number of user interactions associated with the playlist that have been received subsequent to the initial user input that caused the media asset from playing back and being removed from the playlist. The computation may be facilitated by adding "1" to a counter each time an interaction is detected. A running computation of the number of user interactions may be stored locally (e.g., in storage 308) or remotely (e.g., in media guidance data source 418). Similarly, a threshold number may be stored locally (e.g., in storage 308) or remotely (e.g., in media guidance data source 418). The threshold number may indicate a number of user interactions that must occur since the initial user input before a function is performed by control circuitry. For example, the threshold number may reflect that at least 50 user interactions must occur after a song is skipped before the song is inserted back into the playlist. Control circuitry 304 may retrieve the number of user interactions and the threshold from their storage locations via a query sent via communications network 414. Control circuitry 304 may then compare the number of user interactions to the threshold number, and, in response to determining that the number of user interactions corresponds to the threshold number, control circuitry 304 may insert the media asset that was initially caused to cease from playing and be removed from the playlist to be inserted back into the playlist.

In some embodiments, the threshold number may be determined based on a number of media assets in the playlist. For example, if a playlist is short, the threshold number may be lower such that the songs are inserted back into the playlist to avoid the playlist becoming completely depleted.

In some embodiments, the number of user interactions detected may be reset by control circuitry 304 each time the user ceases to utilize the playlist. The number of user interactions may be reset because the playlist may be refreshed after the user ceases to utilize the playlist, such that the playlist is in its original form the next time the user accesses the playlist. For example, control circuitry 304 may instruct storage 308 to reset the number of user interactions to zero when the user exits from a playlist provider such as an Internet radio service. In other embodiments, when control circuitry 304 determines that the user ceases to utilize the playlist (e.g., the user has exited a playlist application), control circuitry 304 may store the determined number of user interactions in storage (e.g., storage 308 or media guidance data source 418). Subsequently, when control circuitry 304 determines that the playlist is again accessed by the user, control circuitry may retrieve the stored determined number of user interactions from storage (e.g., by sending a query via communications network 414). When subsequent user interactions are detected by control circuitry 304, control circuitry 304 may resume counting from the stored determined number of user interactions.

In some embodiments, a playlist menu may initially be accessed at a first user equipment device, but may subsequently be accessed at a different, second equipment device. In such a case, control circuitry 304 may store a number of user interactions detected at storage 308 or media guidance data source 418. Control circuitry at a server or at the second device may subsequently retrieve the number of user interactions at the second device and resume counting therefrom in a manner consistent with that described in the foregoing when the playlist menu is accessed at the second device.

In some embodiments, the media asset may be selectively inserted into a position on the playlist. For example, control circuitry 304 may determine that a sequence of media assets is substantially related to the media asset, and may therefore choose to insert the media asset into a position proximate to the sequence of media assets. In some embodiments, control circuitry 304 may cause the media asset to be inserted into the back of the playlist. For example, control circuitry 304 may cause the media asset to be inserted into the back of the playlist based on a delay selected by a user.

Figure 6:
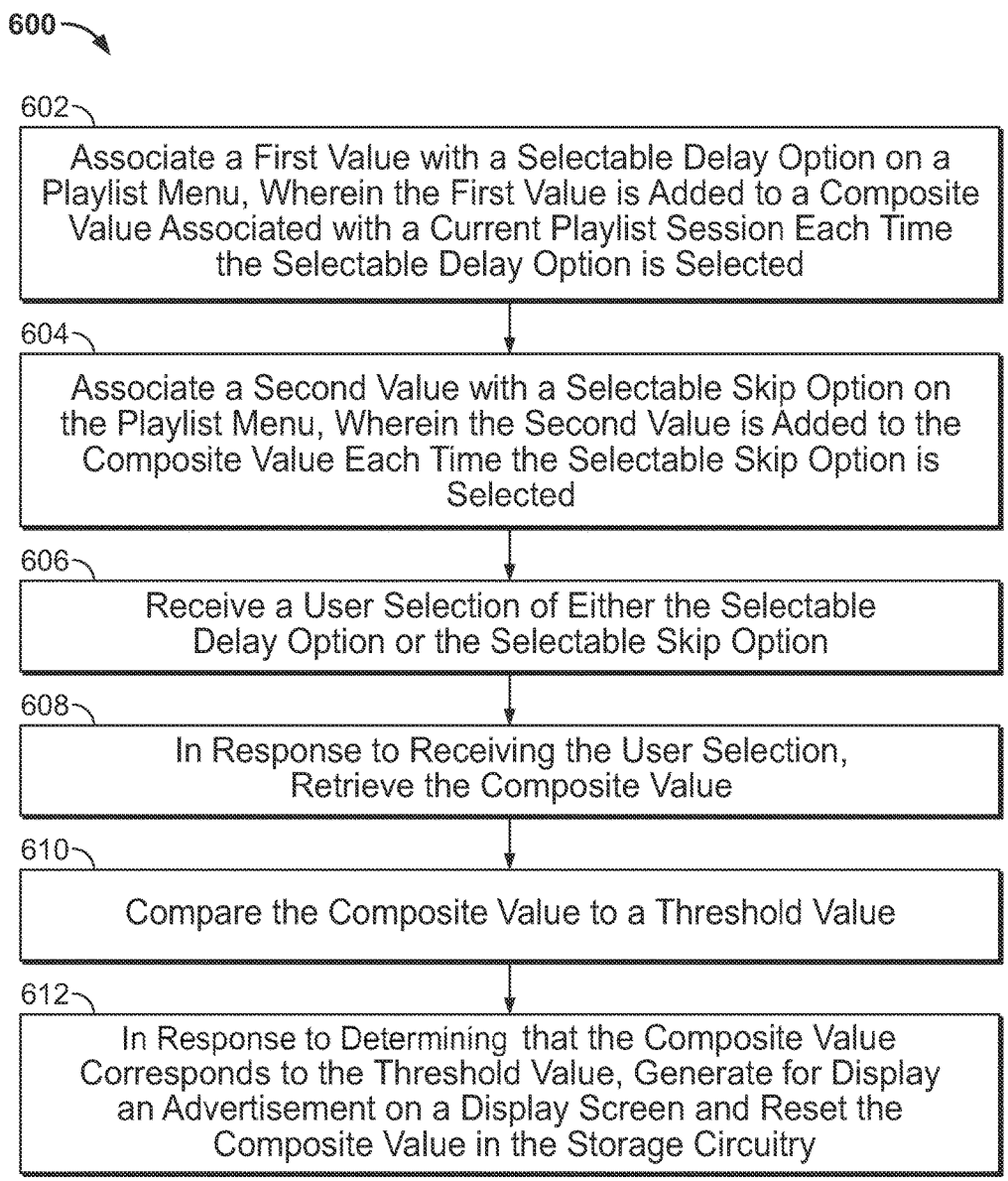
FIG. 6 is a flowchart of illustrative steps involved in determining a dynamic advertisement schedule in accordance with some embodiments of the disclosure.

FIG. 6 is a flowchart of illustrative steps for determining a dynamic advertisement schedule for a playlist provider. It should be noted that process 600 or any step thereof could be performed on, or provided by, any of the devices shown in FIGS. 3-4. For example, process 600 may be executed by control circuitry 304 (FIG. 3) as instructed by a media guidance application implemented on a user device (e.g., user equipment devices 402, 404, and/or 406 (FIG. 4)) in order to determine whether to retain media assets (e.g., as discussed in relation to FIGS. 1-2). In addition, one or more steps of process 600 may be incorporated into or combined with one or more steps of any other process or embodiment.

In some embodiments, a provider of playlist-based media assets may wish to dynamically schedule advertisements for playback during a playlist session. The provider may install control circuitry that associates a first value with a delay option on a playlist menu in storage circuitry, and associates a second value with a skip option in the storage circuitry. For example, the provider may assign more weight to a delay option than a skip option, where, if a delay option is selected more often than a skip option, control circuitry will generate for display an advertisement faster than it would have if a skip option was instead displayed. The control circuitry may receive a user selection of either the delay or skip options, add the associated first or second value to a composite value, and determine whether the composite value has reached a threshold. If it has reached a threshold, the control circuitry may generate for display an advertisement and may reset the composite value in the storage circuitry.

FIG. 6 is a flowchart of illustrative steps involved in determining a dynamic advertisement schedule in accordance with some embodiments of the disclosure. In step 602, control circuitry (e.g., control circuitry 304) may associate a first value associated with a selectable delay option (e.g., delay option 512a) on a playlist menu (e.g., playlist menu 500a). For example, a playlist provider may determine that, when a delay option is selected, a user is most likely to be paying attention to the playlist menu, so an advertisement should be played sooner rather than later. The association may be stored in storage circuitry. The storage circuitry may be local (e.g., storage 308) or remote (e.g., media guidance data source 418). If the storage occurs remotely, control circuitry 304 may transmit the association to media guidance data source 418 or retrieve the association from media guidance data source 418 via communications network 414. When control circuitry 304 detects that selectable option 512a has been selected, control circuitry 304 may add the first value to a composite value associated with a current playlist session. The composite value may be stored locally or remotely in storage circuitry as described in the foregoing. In step 604, control circuitry 304 may associate a second value with a selectable skip option (e.g., skip option 510a) on the playlist menu, where the second value is added to the composite value each time the selectable skip option is selected. Similar to the selectable delay option, a playlist provider may believe that, when a selectable skip option is selected, a user is likely to be paying attention to the playlist menu 500a, so it is an opportune time to play an advertisement. A different weight may be associated with the skip option because a user may be believed to be focusing less on playlist menu 500a when skipping a media asset versus delaying a media asset, as delaying the media asset may require navigating through an extra menu (e.g., menu 514a). The association may be stored in storage circuitry in any manner described above with respect to the association of the first value and the selectable delay option.

In step 606, control circuitry (e.g., control circuitry 304) may receive a user selection of either the selectable delay option (e.g., delay option 512a) or the selectable skip option (e.g., skip option 510a). For example, during a playlist session (e.g., as navigated using playlist menu 500a), a user may wish to hear a different song. In response to control circuitry 304 receiving the user selection, step 608 may be executed, where control circuitry 304 retrieves the composite value from storage circuitry (e.g., storage 308).

In step 610, control circuitry 304 may compare the composite value to a threshold value to determine whether the composite value equals or exceeds the threshold value. Control circuitry 304 may execute this comparison in order to determine whether it is time to play an advertisement. For example, if each time delay option 512a is pressed, control circuitry 304 may add a value of two to the composite value. Furthermore, if each time skip option 510a is pressed, control circuitry 304 may add a value of one to the composite value. Accordingly, if the threshold value is ten, the threshold value may not be reached until, e.g., delay is pressed four times and skip is pressed two times.

In step 612, control circuitry 304 may determine that that the composite value corresponds to (e.g., equals or exceeds) the threshold value. If control circuitry 304 makes this determination, control circuitry 304 may generate an advertisement (e.g., for display on display 310). Control circuitry 304 may also reset the composite value in the control circuitry. To reset the composite value, control circuitry 304 may send an instruction to storage circuitry (e.g., transmit an instruction to media guidance data source 418 via communications network 414) to set the composite value to a value of zero.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

Figure 7:
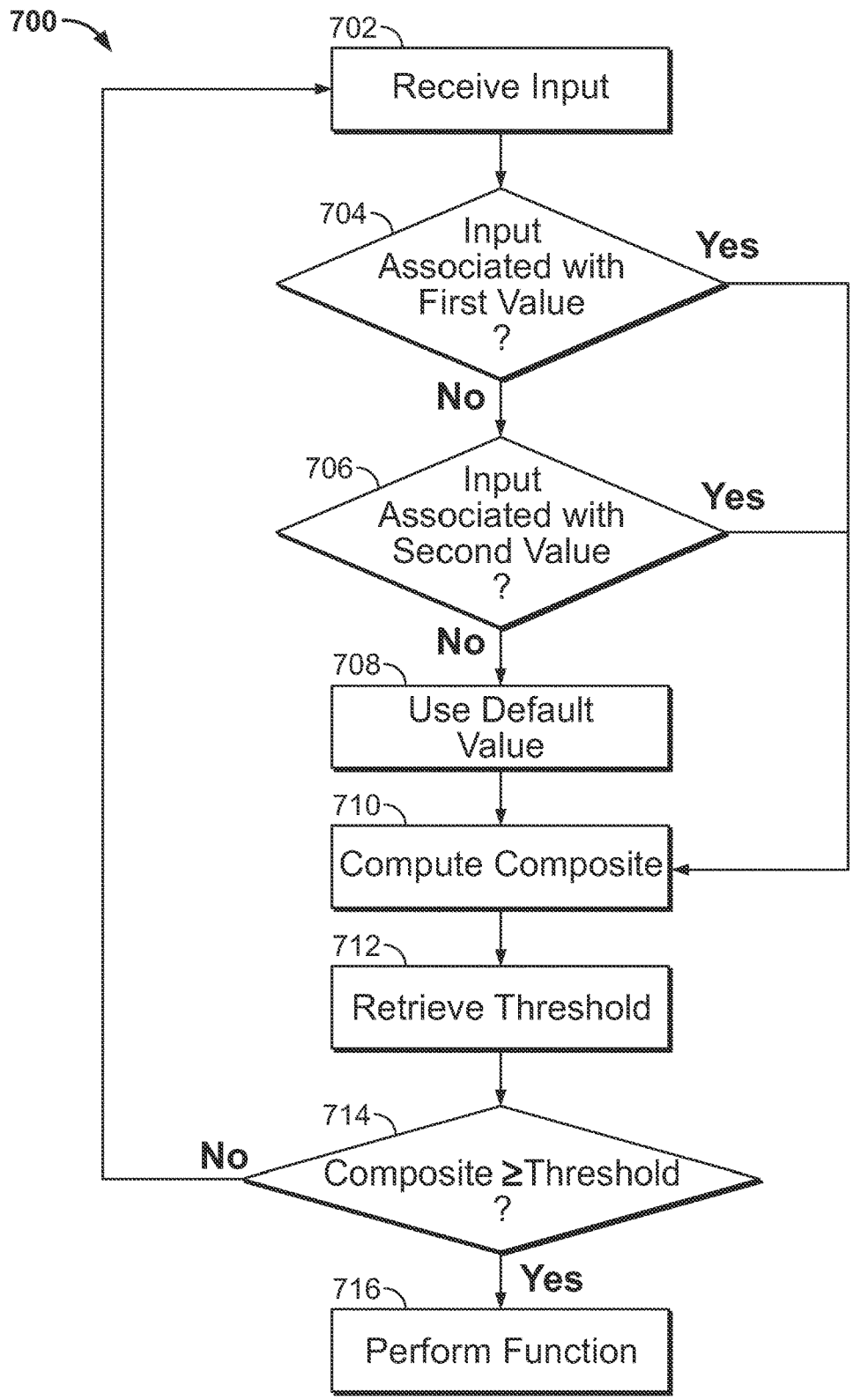
FIG. 7 is a flowchart of illustrative steps involved in determining a composite value for determining a dynamic advertisement schedule in accordance with some embodiments of the disclosure.

FIG. 7 is a flowchart of illustrative steps for determining a dynamic advertisement schedule for a playlist provider by determining a composite value based on user selections of selectable options. It should be noted that process 700 or any step thereof could be performed on, or provided by, any of the devices shown in FIGS. 3-4. For example, process 600 may be executed by control circuitry 304 (FIG. 3) as instructed by a media guidance application implemented on a user device (e.g., user equipment devices 402, 404, and/or 406 (FIG. 4)) in order to determine whether to retain media assets (e.g., as discussed in relation to FIGS. 1-2). In addition, one or more steps of process 700 may be incorporated into or combined with one or more steps of any other process or embodiment (e.g., process 600 (FIG. 6)).

In some embodiments, control circuitry (e.g., control circuitry 304) makes decisions based on associations stored in storage circuitry. For example, a decision may be made as to whether a received user input is associated with a value for addition to a composite value. The composite value may be utilized to determine whether a function is to be performed (e.g., whether an advertisement is to be played back).

FIG. 7 is a flowchart of illustrative determinative steps involved in determining a dynamic advertisement schedule in accordance with some embodiments of the disclosure. In step 702, control circuitry (e.g., control circuitry 304) may receive an input (e.g., via user input interface 310). The input may be selection of a playlist option of playlist menu 500 (e.g., "thumbs up" option 502a, "thumbs down" option 504a, "play" option 506a, "pause" option 508a, "skip" option 510a, and/or "delay" option 512a). The input may also be the selection of any other interactive portion of playlist menu 500a (e.g., media asset representation 516a), or may be any other manipulation of media associated with playlist menu 500a (e.g., selection of advertisement 524b, or the opening or closing of an application associated with playlist menu 500a such as an Internet radio station).

In step 704, control circuitry 304 may determine whether a received user input is associated with a first value. For example, some selectable options may be associated with a certain value (e.g., skip option 510a and delay option 512a may be both associated with a value of three). Similarly, in step 706 control circuitry may determine whether the received input is associated with a second value if it is determined that the received input is not associated with the second value. Some selectable options may be associated with the second value (e.g., thumbs up option 502a and thumbs down option 504a may both be associated with a value of two). Control circuitry 304 may perform this determination by consulting storage circuitry (e.g., storage 308) to determine whether an association with the first value or second value exists. If no association exists with either the first value or the second value, step 708 will be executed, where control circuitry 304 may utilize a default value. The default value may be a value of zero, or may be a higher value. For example, if control circuitry 304 determines that the user has supplied a subscription payment, then control circuitry 304 may determine that the default value is zero. Otherwise, control circuitry 304 may determine that the default value is one. The first value, second value, and default value may be assigned by a playlist provider where values are higher if a particular interaction associated with a value is deemed to indicate that a user is more attentive to a playlist menu (e.g., playlist menu 500a) relative to another user interaction, such that an advertisement is more likely to play when the user is attentive.

Step 710 is executed whenever control circuitry 304 determines that the received input is associated with the first value as per step 704 or is associated with the second value as per step 706, or control circuitry 304 determines that the default value is to be used as per step 708. When executing step 710, control circuitry 304 computes a composite value. Control circuitry 304 then retrieves a threshold value in step 712. The purpose of retrieving the threshold value is to compare the composite value to the threshold value to determine if a function is to be performed (e.g., an advertisement is to be played). The threshold value may be retrieved from storage circuitry (e.g., media guidance data source 418, which may be accessed via communications network 414).

Control circuitry 304 may determine whether the composite value equals or exceeds the threshold value in step 714. This determination may be performed by computing whether the value of the composite value is a higher or equal value to the threshold value. If the composite value does not equal or exceed the threshold, control circuitry 304 may begin the process anew when new input is received. If the composite value does equal or exceed the threshold, control circuitry 304 may perform a function (e.g., play back an advertisement, or replace media asset representation 516a with advertisement 524b).

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

Figure 8:
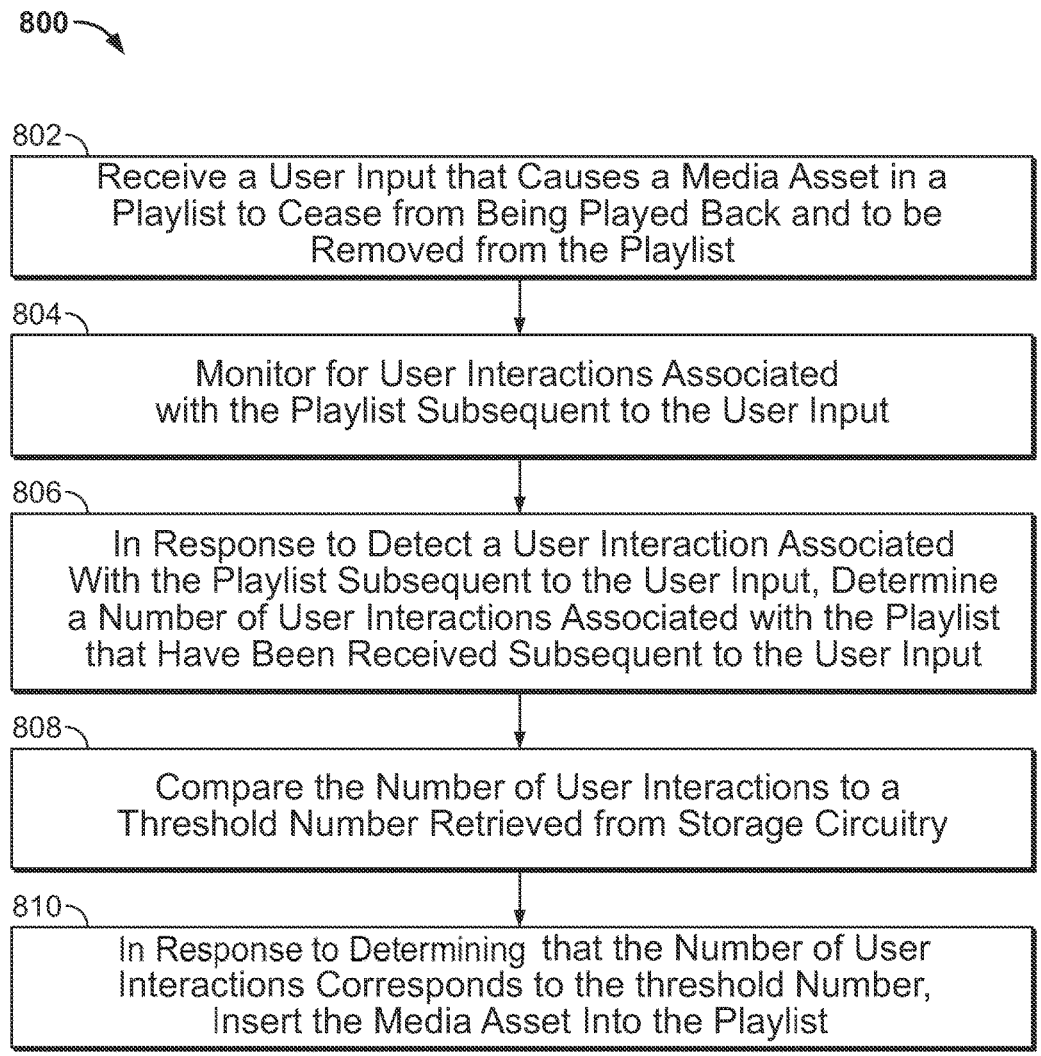
FIG. 8 is a flowchart of illustrative steps involved in modifying playlists of media assets in accordance with some embodiments of the invention.

FIG. 8 is a flowchart of illustrative steps for determining a modification of a playlist of media assets. It should be noted that process 800 or any step thereof could be performed on, or provided by, any of the devices shown in FIGS. 3-4. For example, process 800 may be executed by control circuitry 304 (FIG. 3) as instructed by a media guidance application implemented on a user device (e.g., user equipment devices 402, 404, and/or 406 (FIG. 4)) in order to determine whether to retain media assets (e.g., as discussed in relation to FIGS. 1-2). In addition, one or more steps of process 800 may be incorporated into or combined with one or more steps of any other process or embodiment (e.g., process 600 (FIG. 6)).

In some embodiments, playlists of media assets may be modified by a system or a user. For example, a user may specify that a media asset is to cease playing, and control circuitry (e.g., control circuitry 304) may remove the media asset from the playlist. Control circuitry may monitor for user interactions associated with the playlist in order to determine whether and when to insert the stopped media asset back into the playlist, and may insert the media asset back into the playlist when a threshold number of user interactions has been detected by the control circuitry.

FIG. 8 is a flowchart of illustrative steps involved in modifying playlists of media assets in accordance with some embodiments of the invention. In step 802, control circuitry (e.g., control circuitry 304) may receive a user input (e.g., a selection of a "pause" option 508a, received via user input interface 310). In response to receiving the user input, control circuitry 304 may cause a currently playing media asset to stop playing. Control circuitry 304 may also remove the media asset from the playlist. For example, control circuitry 304 may send an instruction to storage circuitry (e.g., storage 308) to delete the media asset from a playlist that is stored at the storage circuitry.

In step 804, control circuitry 304 may monitor for user interactions associated with the playlist subsequent to the initial user input. For example, control circuitry 304 may monitor for user selection of any interactive or selectable feature of playlist menu 500a, such as selectable options 502a, 504a, 506a, 508a, 510a, or 512a. Control circuitry 304 may also monitor for user interactions that manipulate an application including the playlist (e.g., the opening or closing of a browser page or an application that runs an Internet radio station). Control circuitry 304 may detect a user interaction when an input is received via user input interface 310 that affects a playlist or an application that runs a playlist. Control circuitry 304 may monitor for user interactions in order to determine whether a sufficient number of user interactions have occurred such that a user would not be bored or displeased by the insertion of the removed media asset.

In step 806, control circuitry 304 may detect a user interaction associated with the playlist subsequent to the user input. Control circuitry 304 may responsively determine a number of user interactions associated with the playlist that have been received subsequent to the user input. Control circuitry 304 may perform this determination by consulting a running counter that began with a value of zero, and was incremented by one each time a user interaction was detected by control circuitry 304 subsequent to the user input. The running counter may be stored locally (e.g., at storage 308) or remotely (e.g., at media guidance data source 418, accessible via communications network 414). The running counter will, at any given time, reflect a number of user interactions associated with the playlist that have been received subsequent to the user input.

In step 808, control circuitry 304 may compare the number of user interactions to a threshold number retrieved from storage circuitry (e.g., media guidance data source 418). Control circuitry 304 may retrieve the threshold number from the storage circuitry by transmitting a query for retrieving the threshold number via communications network 414. In performing the comparison, in step 810, control circuitry 304 may determine that the number of user interactions corresponds to the threshold number. For example, control circuitry 304 may determine that the number of user interactions equal or exceeds the threshold number. If the number of user interactions corresponds to the threshold number, control circuitry 304 may insert the media into the playlist.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 8.

Figure 9:
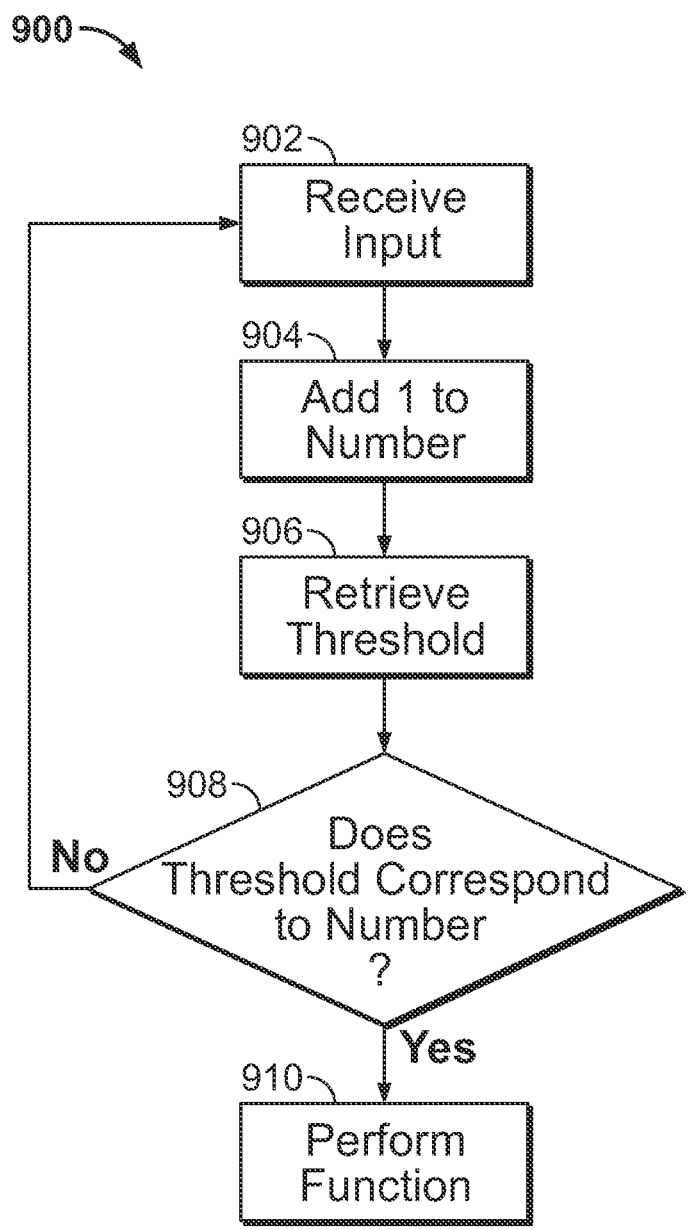
FIG. 9 is a flowchart of illustrative steps involved in determining whether to modify a playlist of media assets in accordance with some embodiments of the invention.

FIG. 9 is a flowchart of illustrative steps for determining whether to modify a playlist by determining a composite value based on user interactions with, e.g., a playlist menu. It should be noted that process 900 or any step thereof could be performed on, or provided by, any of the devices shown in FIGS. 3-4. For example, process 900 may be executed by control circuitry 304 (FIG. 3) as instructed by a media guidance application implemented on a user device (e.g., user equipment devices 402, 404, and/or 406 (FIG. 4)) in order to determine whether to retain media assets (e.g., as discussed in relation to FIGS. 1-2). In addition, one or more steps of process 900 may be incorporated into or combined with one or more steps of any other process or embodiment (e.g., process 600 (FIG. 6)).

In some embodiments, control circuitry 304 may make various determinations in order to determine when a function is to be performed on a playlist. For example, control circuitry 304 may monitor user interactions and repeatedly determine whether the number of user interactions detected has reached a threshold prior to causing an advertisement to play back.

FIG. 9 is a flowchart of illustrative determinative steps involved in modifying playlists of media assets in accordance with some embodiments of the invention. In step 902, control circuitry 304 may receive input. For example, control circuitry 304 may be monitoring for user interactions following the received user selection of skip option 510a. Control circuitry 304 may then add 1 to a number, per step 904, where the number may correspond to a running counter. The running counter may begin with a value of zero, and may be incremented by one each time a user interaction is detected by control circuitry 304 subsequent to the user input. The running counter may be stored locally (e.g., at storage 308) or remotely (e.g., at media guidance data source 418, accessible via communications network 414). The running counter may, at any given time, reflect a number of user interactions associated with the playlist that have been received subsequent to the initial user input.

In step 906, control circuitry may retrieve a threshold from storage circuitry (e.g., storage 308) and control circuitry may then compare the threshold to the number (i.e., the running counter). Control circuitry 304 may then determine whether the threshold corresponds to the number of user interactions detected in step 908. For example, control circuitry 304 may determine that the number of user interactions equal or exceeds the threshold number. If the number of user interactions corresponds to the threshold number, control circuitry 304 may perform a function in step 910 (e.g., insert the skipped media asset into the playlist). Otherwise, control circuitry 304 may continue to monitor for further user interactions and repeat the steps detailed in the foregoing.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 9.

It will be apparent to those of ordinary skill in the art that methods involved in the present invention may be embodied in a computer program product that includes a computer usable and/or readable medium. For example, such a computer usable medium may consist of a read-only memory device, such as a CD-ROM disk or conventional ROM devices, or a random access memory, such as a hard drive device or a computer diskette, having a computer readable program code stored thereon. It should also be understood, that methods, techniques, and processes involved in the present invention may be executed using processing circuitry. For instance, the determination of whether an advertisement should be generated for display as described herein may be performed by processing circuitry, e.g., by processing circuitry 306 of FIG. 3. The processing circuitry, for instance, may be a general purpose processor, a customized integrated circuit (e.g., an ASIC), or a field-programmable gate array (FPGA) within user equipment 108 or one of servers 122 of FIG. 1. For example, playlists and media assets as described herein may be stored in, and retrieved from, storage 308 of FIG. 3, or media guidance data source 418 of FIG. 4. Furthermore, processing circuitry, or a computer program, may update settings associated with a user, a number of user interactions received since an initial user input, updating the information stored within storage 308 of FIG. 3 or media guidance data source 418 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes.

What is claimed is:

1. A method for modifying playlists of media assets, the method comprising:
   receiving a user input, via user input interface circuitry, that indicates a first media asset in a playlist is disliked by the user and causes the first media asset to cease from being played back and to be temporarily removed from the playlist;
   monitoring, using processing circuitry, for user interactions associated with the playlist subsequent to the user input;
   in response to detecting a user interaction associated with the playlist subsequent to the user input, determining a number of user interactions associated with the playlist that have been received subsequent to the user input by:
      counting a first number of user interactions with the playlist that were detected at a first device; and
      subsequently accumulating the first number of user interactions with the playlist with a second number of user interactions with the playlist that are detected at a second device, wherein the second number of user interactions are received by the processing circuitry from the second device independently of the first device;
   comparing, using processing circuitry, the number of user interactions to a threshold number retrieved from storage circuitry; and in response to determining, via the processing circuitry, that the number of user interactions corresponds to the threshold number:
  determining that a second media asset in the playlist is related to the first media asset that was indicated as being disliked by the user, wherein an attribute associated with the second media asset is also associated with the first media asset; and
  in response to determining that the second media asset in the playlist is related to the first media asset that was indicated as being disliked by the user, inserting, using the processing circuitry, the first media asset, that was previously in the playlist and was indicated as being disliked by the user, back into the playlist at a position that follows and is adjacent to the second media asset.

2. The method of claim 1, wherein the user input comprises a selection of a selectable skip option.

3. The method of claim 1, wherein the user input comprises a selection of a selectable delay option.

4. The method of claim 1, wherein the predetermined playlist interaction comprises at least one of:
  skipping a currently played media asset, delaying the currently played media asset, closing an application that is playing the currently played media asset, shuffling the playlist, pausing the currently played media asset, and fast forwarding the currently played media asset.

5. The method of claim 1, wherein the threshold number is determined based on a number of songs in the playlist.

6. The method of claim 1, further comprising resetting the number of user interactions when the playlist is exited by a user.

7. The method of claim 1, further comprising:
  determining that the playlist is exited by a user;
  storing, using storage circuitry, the determined number of user interactions;
  determining that the playlist is accessed by the user; and
  retrieving, from the storage circuitry, the stored determined number of user interactions.

8. A system for modifying playlists of media assets, the system comprising:
  storage circuitry configured to:
    store a threshold number; and
  control circuitry configured to:
    receive a user input, via user input interface circuitry, that indicates a first media asset in a playlist is disliked by the user and causes the first media asset to cease from being played back and to be temporarily removed from the playlist;
    monitor for user interactions associated with the playlist subsequent to the user input;
    in response to detecting a user interaction associated with the playlist subsequent to the user input, determine a number of user interactions associated with the playlist that have been received subsequent to the user input by:
      counting a first number of user interactions with the playlist that were detected at a first device; and
      subsequently accumulating the first number of user interactions with the playlist with a second number of user interactions with the playlist that are detected at a second device, wherein the second number of user interactions are received by the processing circuitry from the second device independently of the first device;
    compare the number of user interactions to the threshold number retrieved from the storage circuitry; and
    in response to determining that the number of user interactions corresponds to the threshold number;
      determine that a second media asset in the playlist is related to the first media asset that was indicated as being disliked by the user, wherein an attribute associated with the second media asset is also associated with the first media asset; and
      in response to determining that the second media asset in the playlist is related to the first media asset that was indicated as being disliked by the user, insert the first media asset, that was previously in the playlist and was indicated as being disliked by the user, back into the playlist at a position that follows and is adjacent to the second media asset.

9. The system of claim 8, wherein the user input comprises a selection of a selectable skip option.

10. The system of claim 8, wherein the user input comprises a selection of a selectable delay option.

11. The system of claim 8, wherein the predetermined playlist interaction comprises at least one of: skipping a currently played media asset, delaying the currently played media asset, closing an application that is playing the currently played media asset, shuffling the playlist, pausing the currently played media asset, and fast forwarding the currently played media asset.

12. The system of claim 8, wherein the threshold number is determined based on a number of songs in the playlist.

13. The system of claim 8, wherein the control circuitry further resets the number of user interactions when the playlist is exited by a user.

14. The system of claim 8, wherein the control circuitry is further configured to:
  determine that the playlist is exited by a user;
  store, at the storage circuitry, the determined number of user interactions;
  determine that the playlist is accessed by the user; and
  retrieve, from the storage circuitry, the stored determined number of user interactions.

* * * * *